United States Patent
Futernik et al.

(10) Patent No.: US 8,468,843 B2
(45) Date of Patent: Jun. 25, 2013

(54) TEMPERATURE CONTROL SYSTEM IN A PARKED VEHICLE

(76) Inventors: Vladlen Futernik, Laurence Harbor, NJ (US); Boris Futernik, Laurence Harbor, NJ (US)

(*) Notice: Subject to any disclaimer, the term of this patent is extended or adjusted under 35 U.S.C. 154(b) by 0 days.

(21) Appl. No.: 13/550,697

(22) Filed: Jul. 17, 2012

(65) Prior Publication Data
US 2013/0047651 A1  Feb. 28, 2013

Related U.S. Application Data

(60) Provisional application No. 61/528,500, filed on Aug. 29, 2011.

(51) Int. Cl.
*F25B 49/00* (2006.01)

(52) U.S. Cl.
USPC ............ 62/175; 62/196.2; 62/228.1; 62/236; 62/510

(58) Field of Classification Search
USPC ............... 62/175, 510, 196.2, 228.1, 228.5, 62/133, 236
See application file for complete search history.

(56) References Cited

U.S. PATENT DOCUMENTS

| | | | | |
|---|---|---|---|---|
| 3,866,433 A | * | 2/1975 | Krug | 62/229 |
| 6,698,218 B2 | * | 3/2004 | Goth et al. | 62/175 |
| 2004/0118135 A1 | * | 6/2004 | Lee et al. | 62/175 |
| 2006/0042284 A1 | * | 3/2006 | Heberle et al. | 62/236 |

* cited by examiner

*Primary Examiner* — Marc Norman
(74) *Attorney, Agent, or Firm* — Aleksandr Smushkovich

(57) ABSTRACT

An air-conditioning system for vehicle temperature control incorporates a thermostat having contacts, and a circulation contour, including a condenser, an expansion valve essentially connected with the condenser, an evaporator connected sequentially with the expansion valve, a first tee splitter connected to a common line, a second tee splitter connected to the condenser, a main compressor connected with the first tee splitter and with the second tee splitter, a supplemental compressor connected with the first tee splitter and the second tee splitter. The supplemental compressor is operatively controlled by the thermostat and powered by a supplemental battery. In embodiments, the supplemental compressor is electrically connected with the supplemental battery and operatively controlled by a control circuitry including a power relay, an air-condition relay, and the contacts of thermostat. The proposed system reduces pollutions and saves energy.

1 Claim, 2 Drawing Sheets

TEMPERATURE CONTROL SYSTEM IN A PARKED VEHICLE

CROSS REFERENCE TO RELATED APPLICATIONS

The present patent application partially claims the benefit a U.S. provisional patent application Ser. No. 61/528,500 filed on Aug. 29, 2011, the disclosure of which is incorporated herein in its entirety by reference.

FIELD OF THE INVENTION

The present invention relates to air-conditioning systems, particularly to air-conditioning systems employed in a motor vehicle, especially when the motor-vehicle is parked. The present invention can be used in any sort of vehicle, including but not limited to cars, tractor-trailers, etc.

BACKGROUND OF THE INVENTION

There exists a wide variety of air-conditioners utilized at premises and inside transportation means. The proposed air-conditioning system however substantially differs from known prior art devices in several aspects indicated further below.

There is known a publication 2006-01-0165 "Electric Air Conditioning for Class 8 Tractors" by Bapiraju Surampudi et al (Southwest Research institute), Heather McKee (U.S. Army RDECOM TARDEC National Automotive Center), Anthony S. Carstensen (Masterflux), and James C. Lawrence (Applied Electronics Corporation). The publication covers the design, integration, and testing of an electric air-conditioning system for Class 8 Tractor for day cab cooling. The system incorporates many additional units that complicates its design and makes it expensive for a regular consumer.

There is known U.S. Pat. No. 6,453,678. It teaches a "direct current mini air conditioning system" "provided for a parked truck/boat to cool the sleeping cabin. The cabin air conditioner having a cooling unit comprising a cooling chamber with at least one insulated wall having on opposite sides there of a heat sink and a cooling block having there between thermoelectric chip(s) or a high efficient D.C. compressor or cold storage phase change material. The air conditioning unit also comprises an air intake conduit, a cool air conduit, an exhaust conduit and means of supplying power to the cooling unit. A method for cooling the sleeping cabin through the use of the air conditioning unit disclosed in the invention is also provided." The described system, mounted in the trunk, requires major reconstruction of the vehicle to accommodate the system, and hence is expensive and cost inefficient. The cooling capacity of thermoelectric unit is insufficient, and cannot effectively cool the vehicle's interior.

There is known U.S. Pat. No. 7,543,454 that describes a "method and auxiliary system for operating a comfort subsystem for a vehicle" as follows: "According to one form of the invention, an auxiliary system is provided for supplying air conditioning to the cabin of a truck. The system includes an air conditioning compressor having a jackshaft mounted on a hub of the compressor. The system further includes an electric motor connected to the jackshaft by a belt for the motor, wherein the electric motor has a drive shaft and a pulley rigidly secured thereon, i.e., with no clutch and with no provision for slippage of the pulley relative to the drive shaft. The jackshaft has a pulley thereon for the electric motor drive. An end of the jackshaft that is not proximate to the compressor is rotatably held by a bearing and a bearing bracket in order to increase capability of the jackshaft to withstand side loading." The aforementioned system includes a lot of additional heavy components that makes it complicated, expensive, and difficult for manufacturing.

There is known U.S. Pat. No. 7,584,626 that discloses an "air-conditioning system for a vehicle, in particular an industrial vehicle, and vehicle equipped with said system", wherein "said system comprising: a main internal combustion engine (1); an alternating current electric machine (7) suitable to function as a motor and/or generator; a refrigeration circuit (2) comprising a compressor (3), suitable to be driven by said main engine or by said electric machine; a source (8) of electric power suitable to supply said electric machine; three clutches (10, 11, 12) suitable for independently connecting/disconnecting said main engine to said compressor, to said electric machine or said compressor to said electric machine. Vehicle equipped with said system." The aforesaid system is very complicated and expensive, has three extra clutches and an additional electric machine to drive the AC compressor, requires an electric motor minimum 10 Hp to operate the main AC compressor and an external generator to power the electric machine. Usually, a regular motor vehicle will not have enough space to install this system under the hood.

Known air-conditioning systems typically used in relatively small cars need a power of about 3.5-4.0 kW to compensate heat caused by the engine and transmission, appeared during operation thereof (i.e. in an engine operation mode); sun radiation heating the car's body; passengers' bodies; and an insufficient heat insulation. As opposed to the engine operation mode (when some energy is lost through the car body's panel), during a parked mode (when the car is parked), the engine and transmission heat does not need to be compensated by the air-conditioning system, which allows consuming about ¼ of the power used in the engine operation mode.

BRIEF SUMMARY OF THE INVENTION

It is therefore an object of the present invention to provide an air conditioning system that does not require the vehicle's engine to be turned on in the parked mode. It is a further object of the invention to provide an extremely economical and efficient vehicle air conditioning system that can be easily and quickly connected to or disconnected from a regular vehicle's cooling system. Other objects of the invention might also be found by one skilled in the art upon learning the present disclosure.

Accordingly, an inventive air-conditioning system for temperature control of a vehicle is proposed. The air-conditioning system comprises a thermostat and a circulation contour, which contour includes a condenser, an expansion valve essentially connected with the condenser, an evaporator connected sequentially with the expansion valve through a receiver-drier, connected with the evaporator, a first tee splitter connected to the common line, a second tee splitter connected to the condenser; a main compressor connected with the tee first splitter and with the second tee splitter, a supplemental compressor connected with the tee first splitter and the second tee splitter. The supplemental compressor is operatively controlled by the thermostat and powered preferably by a supplemental battery. In embodiments, the supplemental compressor is electrically connected with the supplemental battery and operatively controlled by a control circuitry including a power relay, an air-condition relay, and a contacts of the thermostat. The proposed system reduces pollutions and saves energy.

DETAIL DESCRIPTIONS OF THE INVENTION

Figure 1:
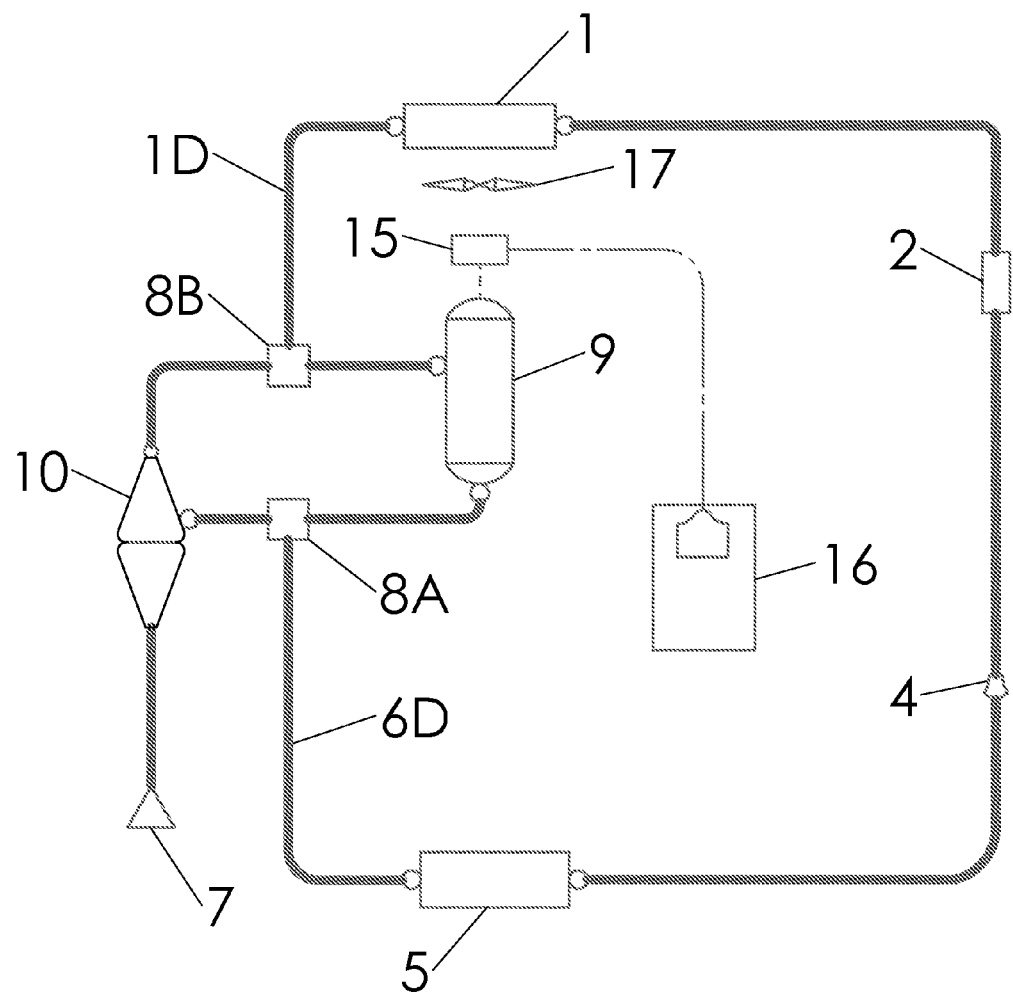
FIG. 1 is a schematic view showing the system for temperature control in a vehicle in accordance with an embodiment of the present invention.

While the invention may be susceptible to embodiment in different forms, there are shown in the drawings, and will be described in detail herein, specific embodiments of the present invention, with the understanding that the instant disclosure is to be considered an exemplification of the principles of the invention, and is not intended to limit the invention to that as illustrated and described herein.

In a preferred embodiment, the inventive air-conditioning system for temperature control of a vehicle's interior, illustrated on FIG. 1, comprises a refrigerant (preferably, freon) circulation contour including: a known condenser (1) (preferably located in front of the vehicle's radiator), having an inlet port and an outlet port connected by a line with a known receiver-drier (2), further connected with a expansion valve (4), further connected with a known evaporator (5) (incorporated into the existing duct system, preferably located in the passenger compartment of the vehicle), further connected to a common line (6D). The line (6D) has an input aperture and an output aperture. The evaporator (5) is specifically connected to the input aperture of line (6D), whereas the output aperture of line (6D) is attached to a first tee splitter (8A).

The refrigerant circulation contour also includes: a known main compressor (9) of the vehicle typically driven by a compressor drive (15) preferably driven by the vehicle's engine (16), an electro operated cooling fan (17) controlled by its own thermostat and an air condition relay (not shown) cooling the condenser (1). The compressor (9) has an input port connected by a line with the first splitter (8A). The compressor (9) has an output port connected by a line with a second tee splitter (8B). Most of the aforesaid units are usually mounted in a regular vehicle, and are utilized by the present invention. Employing the existing units allows for a significant reduction of costs of the proposed air-conditioning system.

According to the present invention, the refrigerant circulation contour also includes: a supplemental electric compressor (10) having an input port connected by a line with the first splitter (8A), and an output port connected by a line with the second tee splitter (8B). Thus, the supplemental electric compressor (10) is connected within the refrigerant circulation contour in parallel with the main compressor (9). The second tee splitter (8B) is connected by a line (1D) with the inlet port of condenser (1).

The vehicle typically has an engine compartment and a trunk. The supplemental electric compressor (10) is preferably mounted in the engine compartment of the vehicle. The supplemental electric compressor (10) is powered by a supplemental battery (11), which can be optionally controllably connected in parallel with a main battery of the vehicle (not shown). The supplemental battery (11) is preferably installed in the trunk of the vehicle.

Figure 2:
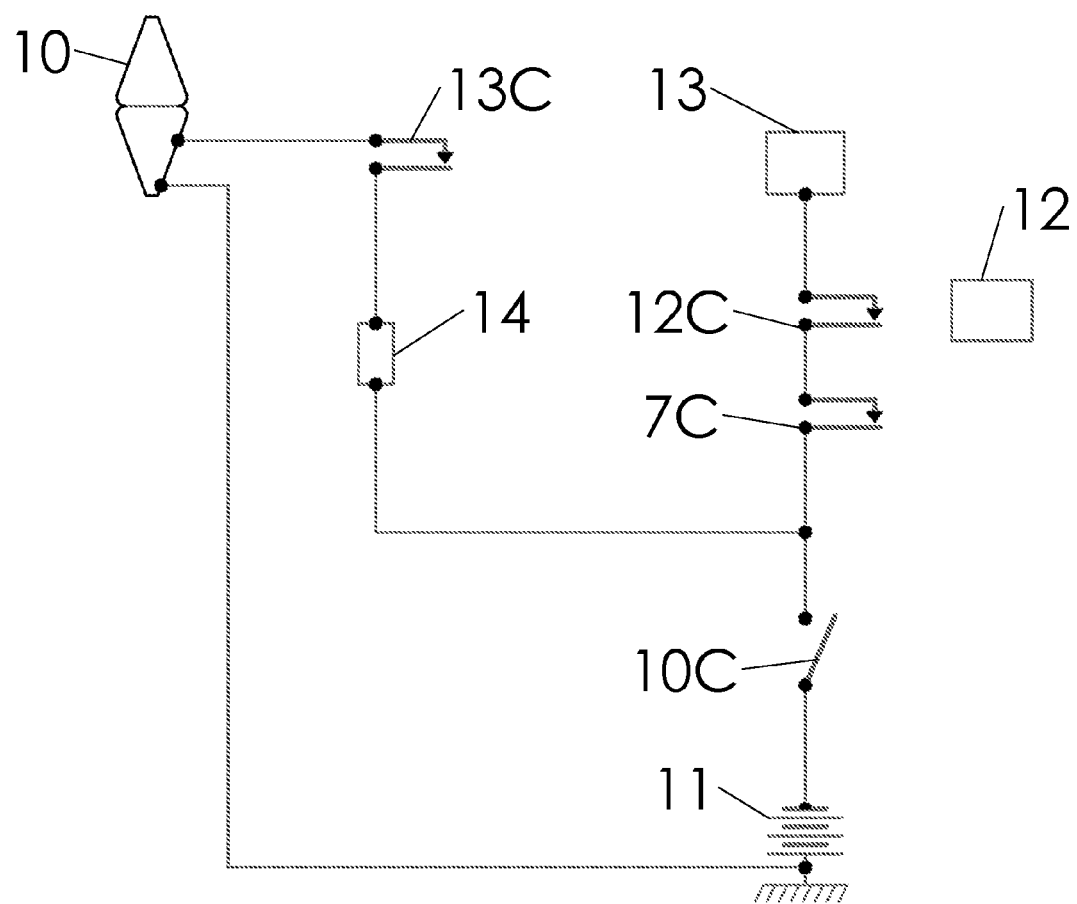
FIG. 2 is a view showing an electric circuitry of the system for temperature control in accordance with an embodiment of the present invention.

The control temperature range is established by a thermostat (7), shown on FIG. 1, which thermostat (7) has contacts (7C) shown on FIG. 2. A preferable control circuitry for control of the supplemental electric compressor (10) is shown on FIG. 2. The control circuitry is composed of the following elements: a power relay (13) having contacts (13C), an air-condition relay (12) having relay contacts (12C), and the supplemental electric compressor (10) electrically connected with the supplemental battery (11) via a fuse (14) and the contacts (13C). The power relay (13) can be fed, for example, from the supplemental battery (11) through the thermostat contacts (7C) and the relay contacts (12C), all sequentially connected with an operative switch (10S).

The supplemental electric compressor (10) turns 'on' when the temperature rises above a threshold level, pre-set on the thermostat (7) by the operator, and the supplemental electric compressor (10) turns 'off' when the temperature drops below the threshold level. This is provided by closing or opening the contacts (7C) that substantially allows or disallows for electric current to flow through the power relay (13), which power relay, through its contacts (13C), connects the supplemental electric compressor (10) to the supplemental battery (11), or disconnects it therefrom, respectively.

In a preferred embodiment of the present invention, the air-conditioning system operates as follows: the operating fluid (preferably, freon) is pumped from the condenser (1) via the receiver drier (2) (that filtrates and dries the refrigerant) and the expansion valve (4) into the evaporator (5). Being expanded in the evaporator (5), the operating fluid is transitioned essentially into the vapor phase, and the line (6D) is drawn into the first tee splitter (8A). The operating fluid can be divided into a main flow capable of entering the input port of the main compressor (9), and a supplemental flow capable of entering the input port of the supplemental compressor (10). Depending on which compressor is driven, either the main flow, or the supplemental flow, or both may further be pumped into the line (1D) and inlet into the condenser (1), wherein the operating fluid is cooled with cool air supplied by the fan (17). Therefore, the following operating modes can be deployed in the proposed air-conditioning system.

Moving Vehicle Operating Mode

During a movement of the vehicle, the operating switch (10S) is turned off, and the supplemental compressor (10) is in an 'off' position (as shown on FIG. 2), i.e. the refrigerant cannot circulate via the supplemental compressor (10). The main compressor (9) pumps the main flow of operating fluid through the refrigerant circulation contour, and the operating fluid cools down the air inside the vehicle, which cooled air is spread through the vehicle's interior by fans (not shown). This is a regular air-conditioning mode for a typical motor vehicle.

Parked Vehicle Operating Mode

When the vehicle is parked, the vehicle's engine and the main compressor (9) are turned off. The operating switch (10S) is turned on by the operator, and the supplemental compressor (10) is in an 'on' position. In this position, the refrigerant circulates via the supplemental compressor (10), but cannot circulate via the main compressor (9). The supplemental compressor (10) now pumps the supplemental flow of operating fluid through the refrigerant circulation contour, and the operating fluid cools down the air inside the vehicle, which cooled air is spread through the vehicle's interior by fans (not shown). Distinctly from the Moving Vehicle Operating Mode, the supplemental compressor (10) consumes in the Parked Vehicle Operating Mode much less power needed to maintain an acceptable temperature that can be controlled by a driver or a passenger of the vehicle. This may save an essential amount of energy that is normally consumed by an idling engine and main compressor of the vehicle. In this mode, the vehicle can operate until the supplemental battery (11) is discharged. The supplemental battery (11) can then be charged by any conventional means suitable therefor.

High-Cooling Operating Mode

Sometimes, during the movement of the vehicle, a high level cooling condition can be required, e.g., during a very high outside temperature, or in a heavy traffic jam, etc. In such a case, both the main compressor (9) and the supplemental compressor (10) can operate in parallel, so that the main and supplemental flows are pumped into the condenser (1) producing much cooler air for cooling the vehicle's interior, i.e. increasing the cooling capacity of the system.

Advantages of the Proposed System

The present invention provides an extremely economical and efficient vehicle air conditioning system that can be easily and quickly installed and connected to or disconnected from a regular cooling system of the vehicle. The proposed system does require small amount an additional of refrigerant. The system can be installed in several types of motor vehicles, preferably but not exclusively, in cars, trucks, tractor-trailers, airplanes, ships, and other transportation means having enough room to install the system.

Although the invention has been explained in relation to its preferred embodiment, it is to be understood that many other possible modifications and variations can be made without departing from the spirit and scope of the invention as herein described.

We claim:

1. An air-conditioning system for temperature control of a vehicle, said vehicle has an engine, said system comprising:
   a thermostat having thermostat contacts; and
   a refrigerant circulation contour including:
      a condenser, having an inlet port and an outlet port;
      an expansion valve substantially connected with said outlet port of the condenser;
      an evaporator connected with said expansion valve;
      a common line having an input aperture and an output aperture,
      a first tee splitter connected to said common line,
      a second tee splitter connected by a line to said inlet port of the condenser;
      a main compressor of the vehicle having a main input port connected with the first tee splitter and a main output port connected with the second tee splitter; and
      a supplemental compressor of the vehicle having a supplemental input port removably connected with the first tee splitter and a supplemental output port removably connected with the second tee splitter;

wherein:
   said supplemental compressor is electrically connected with a supplemental battery; said supplemental compressor is operatively controlled by said thermostat by means of a control circuitry, comprising: a power relay having power relay contacts, and an air-condition relay having air-condition relay contacts;
   said power relay is fed from the supplemental battery through: said thermostat contacts, said air-condition relay contacts, and an operative switch sequentially connected with said supplemental battery;

and wherein:
   the control circuitry is configured to operate such that: during normal operation, when the vehicle is moving, the operative switch is in an off position such that the refrigerant cannot circulate via the supplemental compressor; when the vehicle is parked, said engine and said main compressor are turned off and the operative switch is in an on position so that the supplement compressor is operative; and, during movement, if the vehicle is in high cooling demand, the operative switch is in the on position, and the main compressor and the supplemental compressor operate in parallel.

\* \* \* \* \*